May 9, 1967 C. M. HELLER 3,318,335
TORSIONAL PIPE COUPLING
Filed Oct. 15, 1963 5 Sheets-Sheet 1

INVENTOR.
CHESTER M. HELLER
BY Karl L. Spivak
ATTORNEY

May 9, 1967  C. M. HELLER  3,318,335
TORSIONAL PIPE COUPLING
Filed Oct. 15, 1963  5 Sheets-Sheet 2

INVENTOR.
CHESTER M. HELLER
BY Karl L. Spivak
ATTORNEY

May 9, 1967   C. M. HELLER   3,318,335
TORSIONAL PIPE COUPLING
Filed Oct. 15, 1963   5 Sheets-Sheet 3
FIG. 12
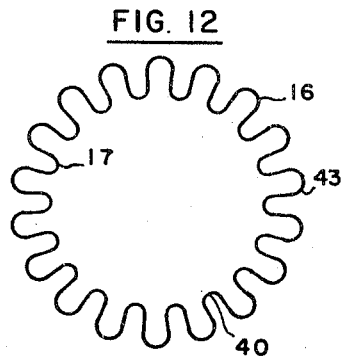
FIG. 13
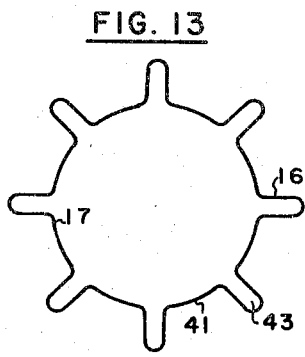
FIG. 14
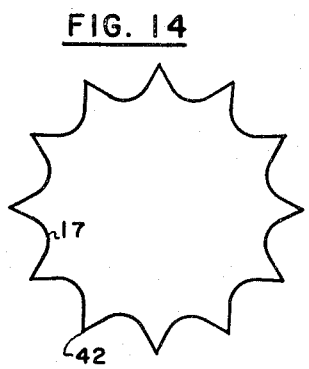
FIG. 15
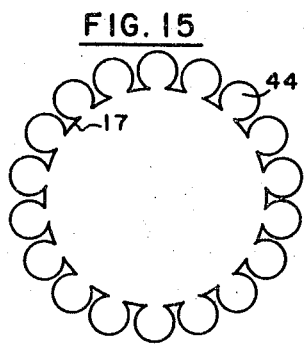
FIG. 16
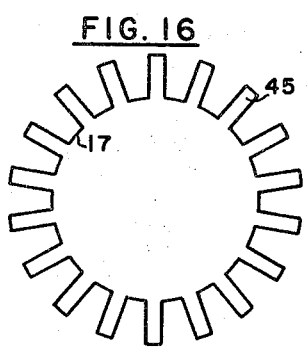
FIG. 17
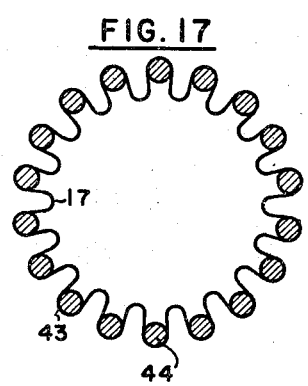
FIG. 18
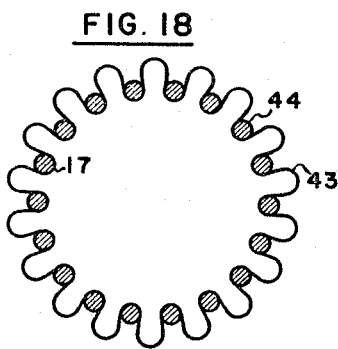
FIG. 19
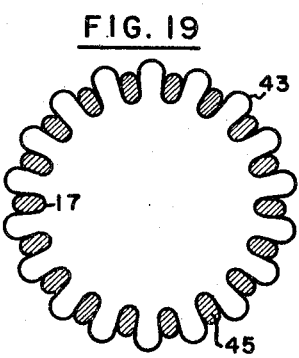
FIG. 20
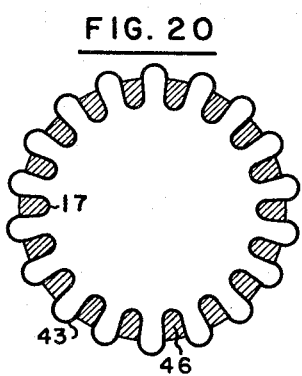
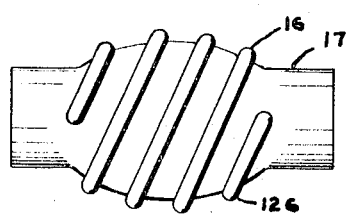
FIG. 34
INVENTOR.
CHESTER M. HELLER
BY *Karl L. Spivak*
ATTORNEY

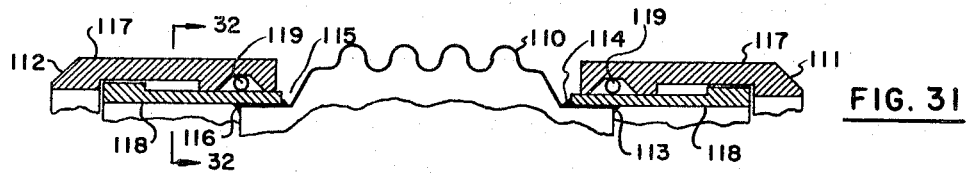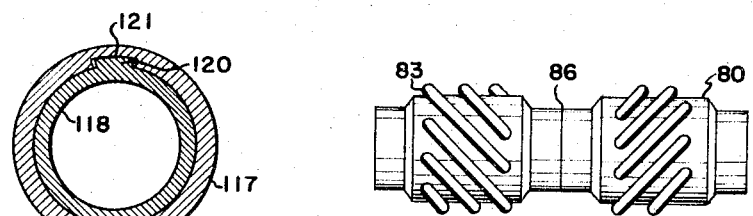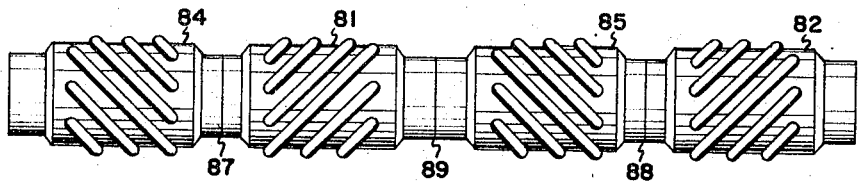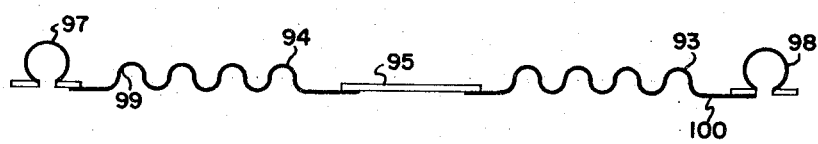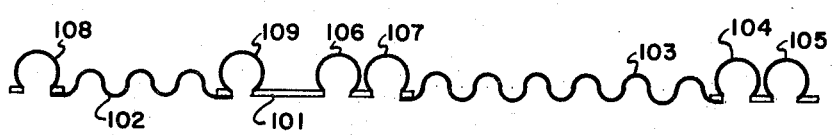

United States Patent Office 3,318,335
Patented May 9, 1967

3,318,335
TORSIONAL PIPE COUPLING
Chester M. Heller, 2411 N. 54th St.,
Philadelphia, Pa. 19131
Filed Oct. 15, 1963, Ser. No. 319,632
33 Claims. (Cl. 138—121)

This invention relates in general to the art of pipe couplings and more particularly is addressed to packless, bellows-type, torsional pipe couplings.

The instant invention provides vast improvements in performance and physical characteristics over my original torsional pipe coupling fully described and principle of operation explained in U.S. Letters Patent No. 3,082,795, dated March 26, 1963. While possessing all the inherent features and advantages of the original device, this new invention is a further advancement in the art of design and construction of torsional pipe couplings and widens the application of the coupling to more industrial fields.

This invention may be entitled in broad terms as a packless, elastic, rotary, universal, flexible, torsional coupling, expansion, swing and swivel joint for piping systems. This lengthy appellation is deemed appropriate since it describes functions of this single device which are presently attributable to a multiplicity of presently known devices, none of which, either singly or in combination, is able to duplicate all of the duties of which the instant invention is capable. Moreover, most, if not all, presently known devices require some form of sealing system, packing gland and sliding or rotating members; none of which are required or even desirable with the present invention.

As with my previous invention, the central bellows has the function of rotating torsionally about the axis of the coupling. It is normally positioned between two end bellows, provided to absorb the decrease in length of the center bellows as it is torsionally displaced. This central bellows is most unique in its design and function as it may be made in one piece of material and treated for design purposes as a self-contained, pressure-retaining vessel. This is so since this central bellows, may if desired, be left unattached to and independent of any end fittings, such as flange seals, packing glands or rotating members, thereby permitting it independently to function elastically similarly to a torsion spring.

The longitudinal corrugations of presently known central bellows are limited to relatively small amounts of torsion, for when such torsional limits are exceeded, the corrugations have a tendency to buckle. The straight, longitudinal corrugations also suffer from excessive shear and torsional stresses thereby decreasing the useful life of such devices. The buckling and stress problems are largely obviated by the use of the new spiralled corrugations in accordance with the disclosure of the instant invention.

It is therefore an object of this invention to provide a novel torsional pipe coupling requiring no packing glands, seals or sliding members.

It is a further object of this invention to provide a torsional pipe coupling having central portion featuring central bellows of spiral configuration.

It is a further object of this invention to provide a torsional pipe coupling capable of compensating large amounts of torsion in a relatively short length.

It is a further object of this invention to provide a torsional pipe coupling of unique design to reduce shear and torsion stresses thus increasing useful life.

It is another object of this invention to provide a torsional pipe coupling wherein individual corrugations equally absorb torsional forces.

It is a further object of this invention to provide a torsional pipe coupling wherein various configurations of spiral corrugations may be employed.

It is another object of this invention to provide a torsional pipe coupling having varying cross sectional diameter.

It is a further object of this invention to provide a single torsional pipe coupling employing a plurality of torsion absorbing sections in horizontal juxtaposed relation.

It is a further object of this invention to provide a single torsional pipe coupling employing a plurality of torsion absorbing sections and a plurality of transverse annular corrugations.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 12 is a cross section of a central bellows employing U-shaped corrugations.

FIG. 13 is a cross section of a modified corrugation shape.

FIG. 14 is a cross section of a modified corrugation shape.

FIG. 15 is a cross section of a modified corrugation shape.

FIG. 16 is a cross section of a modified corrugation shape.

FIG. 17 is a cross section of a central bellows section employing internal bars.

FIG. 18 is a cross section of a central bellows section employing external bars.

FIG. 19 is a cross section of a central bellows section employing external bars of modified cross sectional shape.

FIG. 20 is a cross section of a central bellows section employing external bars of modified cross sectional shape.

FIG. 26 is a side elevational view of a modified dual arrangement of central bellows units.

FIG. 27 is a side elevational view of a modified tandem arrangement of central bellows units.

FIG. 29 is a partial cross section indicating combination of spiral corrugated central bellows and transverse end corrugations.

FIG. 30 is a partial cross section indicating modified combination of spiral corrugated central bellows and transverse end corrugations.

FIG. 31 is a partial cross section indication application of a spiral corrugated central bellows unit with packing glands.

FIG. 32 is a cross section taken along line 32—32 of FIG. 31.

FIG. 34 is a side elevational view of a central bellows unit of modified corrugation configuration.

Figure 1:
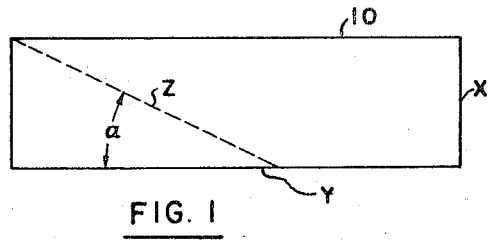
FIG. 1 is a development view of a spirally corrugated cylinder.

Although specific terms are used in the following description for the sake of clarity, these terms are intended to refer only to the particular structure of my invention selected for illustration in the drawings and are not intended to define or limit the scope of the invention.

FIG. 1 is a development view of the spirally corrugated cylinder of a basic torsional displacement bellows 10 wherein the dotted line 2 represents one of the several spiralled corrugations to be employed. From a design standpoint, it is to be noted from this figure that certain effects will be produced upon departure from any established norm. For example, for two cylinders of equal height ($x$) and equal circumferential length ($y$), the one with a lesser number of corrugations, thus having a greater amount of circumferential spiral (as caused by a decrease in angle $a$), will have the greater amount of elasticity and resiliency.

Further, a fifty percent increase in cylinder height ($x$ plus 50%), while maintaining the same base angle of the corrugation element (angle $a$), will require the same number of corrugations, but will increase the lineal amount of circumferential spiral (along $y$) of the corrugations by fifty percent, resulting in an increase in amount of torsional rotation within the elastic limit of the bellows material, or a reduction in the amount of torque required to produce an equal torsional displacement in the original cylinder of height ($x$).

An increase in cylinder height ($x$), accompanied by a decrease in angle $a$, decreases the required number of corrugations, but increases the amount of circumferential spiral in each corrugation, with a resultant increase in elasticity, resiliency and suppleness in the corrugated cylinder.

As another example, an increase in the cylinder height ($x$), accompanied by an increase in the base angle $a$, requires an increase in the number of corrugations, with a consequential decrease in the amount of circumferential spiral in each corrugation, followed by a resultant reduction in elasticity, resiliency and suppleness.

As another example, a reduction of cylinder height ($x$), while maintaining the same base angle $a$, requires retention of the same number of corrugations as originally used, but decreases the amount of circumferential spiral in each corrugation, and hence, reduces elasticity, resiliency and suppleness.

Figure 2:
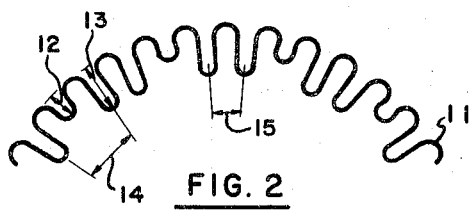
FIG. 2 is a fragmentary cross section of a sidewall of a modification of a spiral, corrugated element.

It is obvious that other combinations of departures are possible and that the foregoing examples are set forth for purposes of illustration only and should not be construed as limiting the scope of the invention. Many different effects on torsional properties, physical characteristics and torque load factors are likewise possible to be obtained by the designer through other than usual means outlined above, by such measures as variations in depth and pitch of the spiral corrugations as well as by alternately varying the depth and pitch. As indicated in FIG. 2, the sidewall 11 of a spiral, corrugated element may be variously corrugated using a plurality of depths 12, 13 and a plurality of pitches 14, 15 as calculated by the designer.

Figure 3:
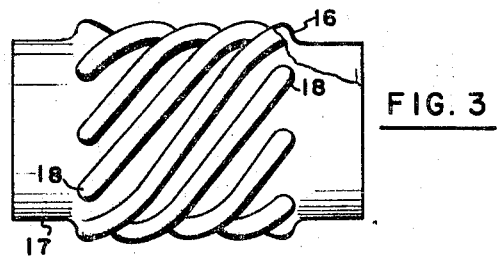
FIG. 3 is a side elevational view of a spiral corrugated central bellows.

The corrugations 16 of a central bellows unit 17 may be formed by hydraulic, explosive or other similarly resulting methods, by forming from a single finished tube against corrugation producing dies or the corrugations may be mechanically press formed in a flat sheet and then later welded or otherwise joined into tubular form. As seen in FIG. 3, corrugations 16 spiral about the outer periphery of the bellows 17 which lies parallel to the axis of the coupling. Ends 18 of spiral corrugations 16 are fully exposed since they play a vital part in permitting the total spiralled length of each corrugation to absorb its deflective share of the torsional displacement imposed upon the coupling 20.

Figure 4:
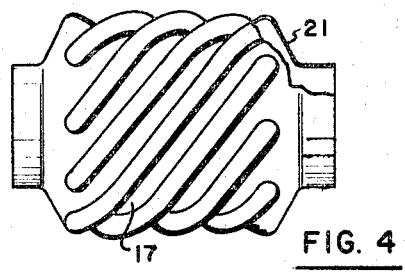
FIG. 4 is a side elevational view of a modified central bellows.
Figure 5:
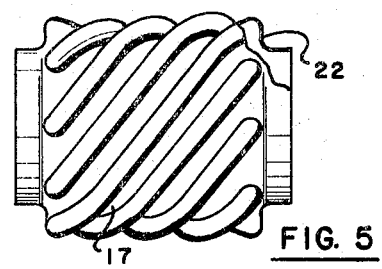
FIG. 5 is a side elevational view of a modified central bellows.
Figure 6:
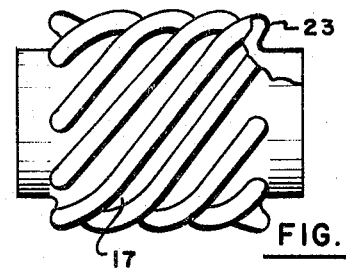
FIG. 6 is a side elevational view of a modified central bellows.
Figure 7:
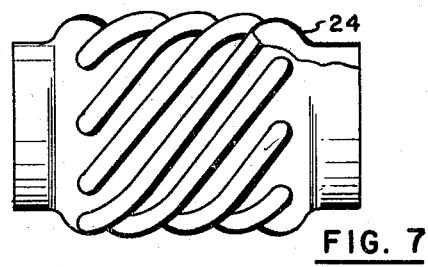
FIG. 7 is a side elevational view of a modified central bellows.

The central bellows unit 17 alone may then be treated as a uniquely functional, torsion spring-like bellows. Just as the complete central bellows 17 may be referred to as a self-contained pressure vessel, so may each of the individual corrugations 16 thereon be treated as separate and distinct pressure vessels unto themselves, since they must be designed to retain pressure without distortion and their ends may be treated as the "heads" of the vessel and subject to its own design variations. As seen in FIGS. 4–7, various type coupling ends may be employed by the designer and still fall within the scope of this invention. FIG. 4 illustrates angled ends 21; FIG. 5 illustrates perpendicular ends 22; FIG. 6 illustrates concave ends 23; and FIG. 7 illustrates convex ends 24.

Figure 9:
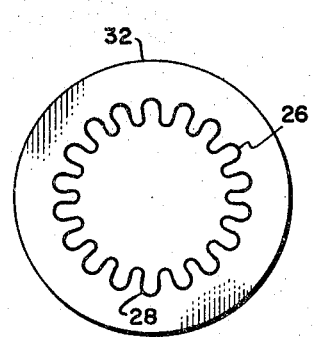
FIG. 9 is an end view of the coupling of FIG. 8.
Figure 8:
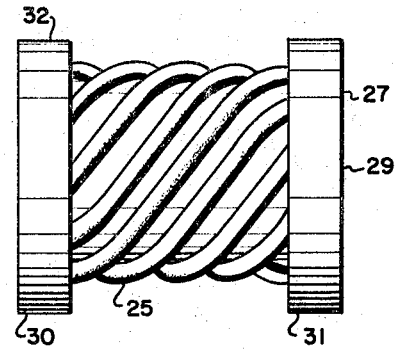
FIG. 8 is a side elevational view of a central bellows contained within end retaining rings.
Figure 10:
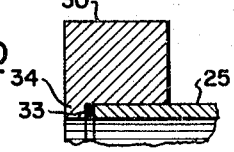
FIG. 10 is a fragmentary cross sectional view showing connection of end retaining ring to central bellows of FIG. 8.
Figure 11:
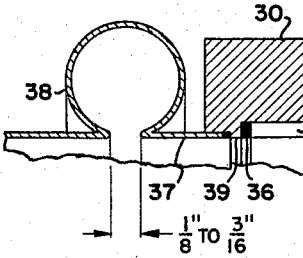
FIG. 11 is a fragmentary cross sectional view showing connection of end retaining ring to central bellows and transverse end corrugations when applied to FIG. 8.

Referring now to FIG. 8, a central spiral corrugated section 25 is provided featuring open ends 26, 27 projecting into formed openings 28, 29 of end retaining rings 30, 31 and terminating flush with outermost surfaces thereof and welded thereto. The outer rim 32 of the retaining rings 30, 31 may be circular shaped as indicated in FIG. 9 or may be any other shape (as square, oval, etc.) as necessary or required by the intended use. FIG. 10 shows attachment of the spiral section 25 to the end retaining ring 30 by continuous weld joint 33 where an annular lip 34 terminates the coupling. FIG. 11 illustrates attachment of the spiral section 25 to the end retaining ring 30 providing interior circular recess 35 through a continuous weld joint 36. A second interior recess 37 permits convenient connection of ring 30 to a piping section (not shown) or to transverse corrugations 38 by a continuous internal weld 39.

As seen in FIG. 12, I prefer to construct the spiralled corrugations 16 of central bellows unit 17 in the form of the U-shaped corrugations 43 employed as continuous waves 40. It may also be advantageous at times to employ spiralled corrugations 16 oriented in a staggered fashion leaving cylindrical segments 41 between corrugations as shown in FIG. 13. It is also possible to apply various configurations of spiralled corrugations in the central bellows 17 such as ridged 42 (FIG. 14), torroidal 44 (FIG. 15), rectangular 45 (FIG. 16), etc.

In high pressure work, it is often necessary to use shaped bars of various cross sectional configuration externally between and/or occasionally inside the spiralled corrugations 16 of the central bellows 17 as a pressure retaining member to prevent permanent distortions of the corrugations. FIG. 17 indicates shaped bars 44 of round configuration inserted within the U-shaped corrugations 43. As shown in FIG. 18, the bars 44 may be introduced between corrugations 43 exteriorly of the central bellows 17. FIG. 19 illustrates exterior bars of oval configuration 45. Bars of half-round cross sectional configuration 46 are utilized in FIG. 20.

Figure 21:
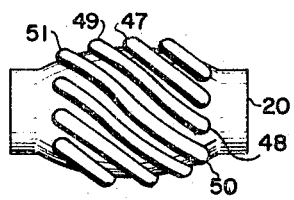
FIG. 21 is a side elevational view of a modified spiral corrugated central bellows.

A twist or torsional rotation about the axis of the coupling 20 causes the central bellows 17 not only to shorten, but also to constrict at the center of the bellows midway between the ends thereby causing this center point to have a lesser inside diameter than the original diameter found at the extreme ends of the coupling. This hour glass effect may be avoided when necessary by adapting a bulbous central bellows design 47 as indicated in FIG. 21. The bulbous design 47 features outwardly bulged or formed corrugations 48 having a maximum diameter 49 at midpoint 50 of the coupling 20. It is thus seen when a twisting motion to the full maximum torsion is imposed, the constricting phenomenon causes the bulbous corrugations to straighten out and the outer periphery 51 of the bellows to lie flat and parallel with the central axis of the coupling 20.

Figure 22:
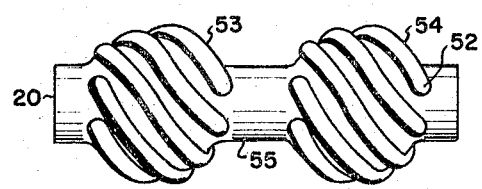
FIG. 22 is a side elevational view of a duplex modified spiral corrugated central bellows.

A twin bulbar design 52 of central bellows is illustrated in FIG. 22 wherein equal spiral bulged corrugations 53, 54 are joined in horizontal juxtaposed relation through a transition piece 55 to form a continuous conduit. While the spiral form of corrugation is shown in the central bellows designs of FIGS. 21 and 22, it is apparent that the same art and effects are likewise applicable to the straight, longitudinal forms of corrugations described in Pat. No. 3,082,795 wherein the bulbous configuration may be employed.

Figure 23:
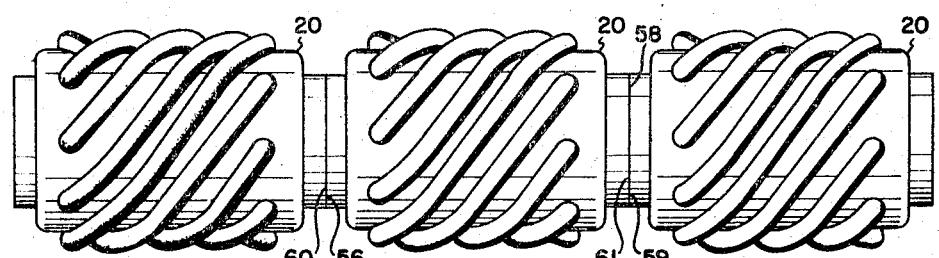
FIG. 23 is a side elevational view of tandem arrangement of central bellows units.

It is to be noted that the central bellows shown in FIGS. 3, 4, 5, 6, 7 and 21 are single unit devices designed to accommodate a fixed maximum rated amount of torsional rotation based on the limiting factors of diameter, number of corrugations, material, depth, shape and thickness of corrugations, amount or angular degree of spiral in each corrugation and the overall longitudinal length of the bellows. All other factors remaining the same, an increase in the amount of allowable torsional rotation may be obtained by an increase in the overall length of bellows, and this may be accomplished in either of two ways. The first method is to actually form a longer length single unit bellows. When this increased length becomes impractical from a material availability or production facility limitations, the second method is easily adapted. This consists of joining several segments together as tandem operating bellows, with no limit as to the number of such bellows capable of being joined. FIG. 23 illustrates 3 individual couplings 20 horizontally juxtaposed and respectively joined at abuting end surfaces 56, 57, 58, 59 to form fluid and pressure tight joints 60, 61.

Figure 24:
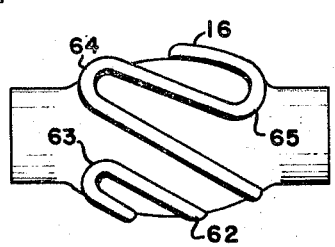
FIG. 24 is a side elevational view of a central bellows unit of modified corrugation configuration.

As shown in FIG. 24, the corrugations 16 at either or both ends of the torsional bellows 17 may also be formed in a manner resulting in a continuously joined spiral format 62. As indicated the corrugation ends 63, 64, 65 terminate in U-shaped portions thereby continuously joining adjacent corrugations.

Figure 25:
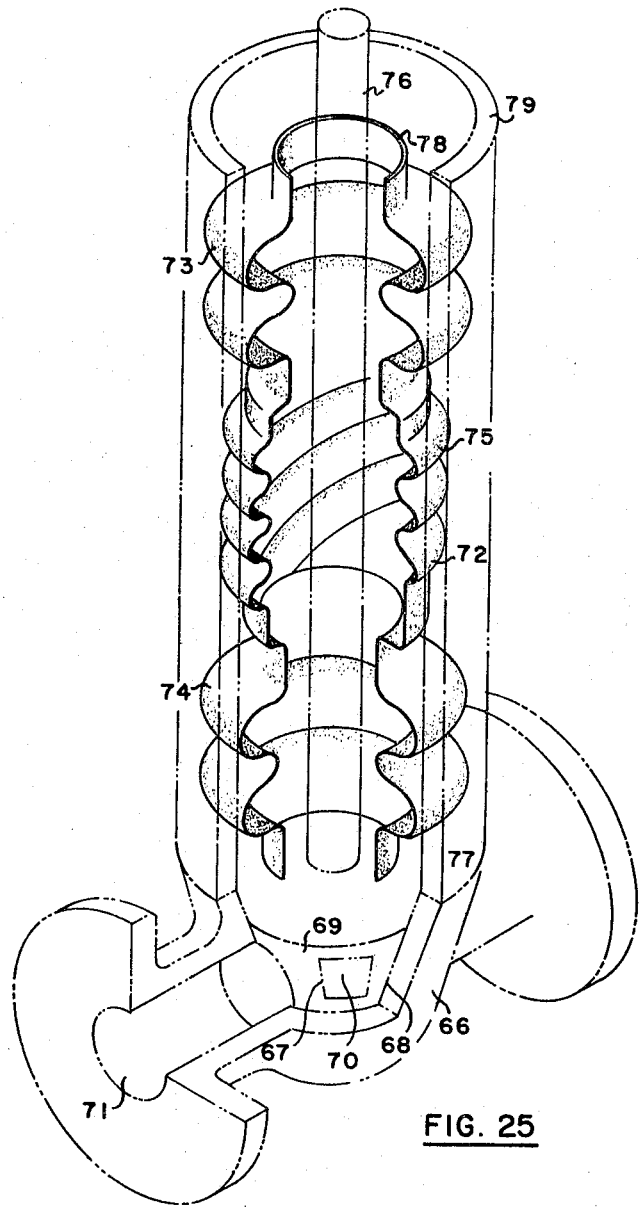
FIG. 25 is a perspective view of an application of the invention to a plug valve.

A unique application of the invention to a device known as a plug valve 66 is illustrated in FIG. 25. The plug 67 is indicated as contacting seat 68 and the valve is in closed position 69. To open the valve, the plug 67 is vertically raised off of the seat 68 a predetermined amount, is rotated a given angular torsion and then relowered to the seat with plug opening 70 rotated 90 degrees to coincide with flow conduit 71. A reversal of this procedure closes the valve. In accordance with the instant invention, a torsional pipe coupling 72 comprising transverse end bellows 73, 74 extending from each end of a spiral bellows element 75 encloses the valve stem 76 and connects with the top 77 of plug 67. The coupling upper end 78 terminates against valve construction 79 in a fluid and pressure tight, stationary joint. Such an application eliminates the need for a packing gland in the valve body and prevents leakage around the valve stem thereby providing a totally packless, bottle-tight valve.

Similar uses for drive shafts, universal joints and other mechanical applications become readily apparent.

Figure 28:
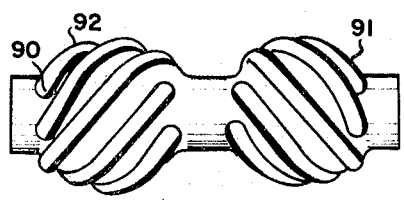
FIG. 28 is a side elevational view of a modified duplex spiral corrugated central bellows.

As seen in FIGS. 26 and 27, two directional rotation is readily accomplished by joining two or more spiral bellows units together. Right hand spiral bellows 80, 81, 82 respectively join left hand spiral bellows units 83, 84, 85 in fluid and pressure tight junctions 86, 87, 88 and two or more pairs may be similarly connected as at joint 89. The acceptable degrees of desired rotation are variable by the number of units joined together, the amount of rotation being directly proportional to the number of units employed. As seen in FIG. 28, a one-piece bellows unit 90 may be formed similar to the unit shown at FIG. 22 except that the corrugations 91, 92 in each half-bellows spiral in opposite directions.

Of course, the units illustrated in FIGS. 26 and 27 when used as shown will produce overall contraction in length by reason of any torsional rotation imposed. When necessary to compensate for this change in length, transverse bellows may be added at the ends of the spiral bellows units. Referring now to a FIG. 29, I show a portion of right spiral bellows 93 joined to juxtaposed left spiral bellows 94 in a pressure and fluid tight joint 95 utilizing a cylindrical mating ring 96. The single, transverse bellows units 97, 98 connect at the free ends 99, 100 of the spiral bellows 94, 93 as required to compensate for the axial motion.

FIG. 30 illustrates a portion of a piping system 101 utilizing a left spiral bellows 102 and a right spiral bellows 103 having overall length approximately twice that of bellows 102. In such a design, twice as many transverse, annular corrugations 104, 105, 106, 107 will be required to absorb the change in length due to the clockwise rotation as found in left end spiral bellows 102 wherein only a single pair of transverse, annular corrugations 108, 109 need be employed.

My invention is equally applicable to a semi-packless type of torsional coupling as shown in FIG. 31. When it is necessary or desirable to maintain a smaller outside diameter of the overall fitting size than that which would be available if end transverse corrugations were employed as hereinbefore described, end packing glands may be utilized. The arrangement shown is termed semi-packless, for although the central, spirally corrugated bellows requires no packing at all, the end pipe fittings are designed as a packing gland arrangement whose function is to retain the internal pressure as well as to take up the axial contraction caused by torsion in the central bellows.

A spirally corrugated bellows 110 constructed in accordance with the instant invention is disposed between end backing glands 111, 112 and is secured by continuous, circular welds 113, 114, 115, 116. Each packing gland 111, 112 includes cooperating cylindrical members 117, 118 in telescoping arrangement with a rubber or metal O-ring 119, suitably retained in any well-known manner, provided therebetween as the sealing element. If desired, it is also possible to apply a more complex packing gland using a sealing element.

Axial contraction caused by torsion in the central bellows 110 is absorbed by the sliding of a key 120 on the inner end fitting 118 inside of the slot 121 on outside end fitting 117. Also, by means of this slot engaging the key, torsional forces may be transmitted to the central spirally corrugated bellows 110. It is not always necessary to use two packed glands, for if the amount of torsion is small, or if it is desired to increase the length of key 120 and slot 121, only one end fitting on one side of the central bellows need be equipped with a packing gland 111. By the same token, it is sometimes required to provide two or more keyed slots in one or both ends of the fitting and two or more central torsional bellows units to compensate for larger amounts of torsion.

Figure 33:
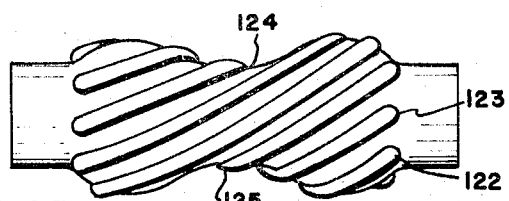
FIG. 33 is a side elevational view of a modified form of spiral corrugated duplex central bellows unit.

In FIG. 33, I show another modification of my invention wherein a central bellows 122 having spiral corrugations 123 is provided with a built-in constriction 123 having smallest circumference 125 at mid-point of bellows forming, in effect, a venturi or hour glass configuration.

As shown in FIG. 34, the corrugations 16 of the torsional bellows 17 may also be formed of a single, continuous spiral 126 in the more conventional helical format in lieu of that shown in FIG. 24.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. An integral, unitary torsional pipe coupling for use in a pressure carrying system comprising a conduit having inlet and outlet terminals, said terminals being connected to adjacent ends of the said pressure carrying system, said conduit having a plurality of spiral corrugations formed in the wall thereof and extending along the length thereof, said corrugations being subjected to the pressures carried by the said pressure carrying system and said conduit being yieldable to torsional forces carried within the said pressure carrying conduit and applied to the said terminals.

2. The invention of claim 1 wherein said spiral corrugations terminate in open ends prior to reaching said conduit terminals.

3. The invention of claim 1 wherein each of said corrugations is of equal depth and equal pitch.

4. The invention of claim 1 wherein said plurality of spiral corrugations comprise individual corrugations of varying depth.

5. The invention of claim 1 wherein said plurality of spiral corrugations comprise individual corrugations of varying pitch.

6. The invention of claim 1 wherein said corrugations are of U-shape cross section.

7. The invention of claim 1 wherein said corrugations are of rectangular cross section.

8. The invention of claim 1 wherein said corrugations are of individual toroidal cross section.

9. The invention of claim 1 wherein pressure retaining means extend externally between said spiral corrugations.

10. The invention of claim 1 wherein pressure retaining means extend inside said corrugations.

11. The invention of claim 1 wherein pressure retaining means extend between said spiral corrugations, said means including shaped bars of circular, half-round and oval cross section, said bars having spiral configuration corresponding to said spiral corrugations.

12. In a torsional pipe coupling, a plurality of spiral corrugated bellows units each comprising a conduit having inlet and outlet terminals, said conduit having a plurality of spiral corrugations formed in the wall thereof and extending along the length thereof, said conduit being yieldable to torsional forces applied to the said terminals; said units joined in pressure and fluid tight joints at respective terminals.

13. The invention of claim 12 wherein said spiral corrugations of said units spiral in the same direction.

14. The invention of claim 12 wherein said spiral corrugations of said units spiral in opposite directions.

15. A torsional pipe coupling comprising a conduit having inlet and outlet terminals, said conduit having a plurality of spiral corrugations formed in the wall thereof and extending along the length thereof, said conduit being yieldable to torsional forces applied to the said terminals, and end retaining rings welded to said terminals.

16. A torsional pipe coupling comprising a conduit having inlet and outlet terminals, said conduit having a plurality of spiral corrugations formed in the wall thereof and extending along the length thereof, said conduit being yieldable to torsional forces applied to the said terminals, end retaining rings welded to said terminals and end transverse corrugations welded to said retaining rings outboard said conduit.

17. A torsional pipe coupling comprising a conduit having a first plurality of spiral corrugations formed in the wall thereof providing a corrugated bellows unit, a second plurality of spiral corrugations formed in said conduit wall and juxtaposed from said first bellows forming a second corrugated bellows unit, and a circular transition piece defined between said first and second bellows units.

18. The invention of claim 17 wherein corrugations of said first and second bellows units spiral in the same direction.

19. The invention of claim 17 wherein corrugations of said first and second bellows units spiral in opposite directions.

20. In a torsional pipe coupling, a cylindrical conduit with peripheral walls of thin, strong material capable of being formed into corrugations having inlet and outlet connections disposed laterally from a central, transverse axis and a corrugated bellows of generally circular cross section arranged between said inlet and outlet connections, said corrugated bellows having transverse central axis and said bellows having outside diameter varying along the length of the bellows.

21. In the invention of claim 20, a central bellows unit wherein said corrugations are longitudinal corrugations formed in conduit wall.

22. In the invention of claim 20, a central bellows unit wherein said corrugations are spiral corrugations.

23. In the invention of claim 20, a coupling wherein the transverse central axis of the bellows coincides with the transverse central axis of the coupling.

24. In the invention of claim 20, a coupling wherein the said outside diameter of bellows is maximum at said transverse central axis of bellows.

25. In the invention of claim 20, a coupling wherein the said outside diameter of bellows is minimum at said transverse central axis of bellows.

26. In the invention of claim 20, a coupling wherein the transverse central axis of the bellows coincides with the transverse central axis of the coupling, and wherein the said outside diameter of bellows is maximum at said transverse central axis.

27. In the invention of claim 20, a coupling wherein the transverse central axis of the bellows coincides with the transverse central axis of the coupling, and wherein the said outside diameter of bellows is minimum at said transverse central axis.

28. A torsional pipe coupling comprising a generally circular, unitary, jointless conduit wall construction including torsional force yielding means, expansion force yielding means and contraction force yielding means, said means joined in continuous end to end relation, said torsional force yielding means incorporating a plurality of spiral, peripheral corrugations extending between said expansion and contraction force yielding means.

29. The invention of claim 28 wherein said contraction force yielding means incorporating a plurality of transverse, annular corrugations and said expansion force yielding means incorporating a plurality of transverse annular corrugations.

30. The invention of claim 28 wherein said contraction force yielding means incorporate a longitudinally sliding packing gland and said expansion force yielding means incorpoarted a longitudinally sliding packing gland.

31. A torsional pipe coupling comprising a length of conduit including a centrally positioned, torsional force yielding means having open ends, expansion force and contraction force yielding means extending from each said end in lateral juxtaposition thereto, all of said means fabricated from a single length of cylindrical tubing and defining smooth, stress-free transition pieces therebetween; said torsional force yielding means comprising a plurality of spiral corrugations, said corrugations having equal dimensions and extending spirally along the length of said conduit.

32. The invention of claim 31 wherein said expansion force yielding means comprise a plurality of transverse corrugations, said corrugations having equal dimensions and arranged transverse to the longitudinal axis of said coupling; said contraction force yielding means comprise a plurality of transverse corrugations, said transverse corrugations being similar to the said expansion force yielding means whereby a single, unitary, low-stress torsional pipe coupling is formed.

33. The invention of claim 31 wherein said contraction force yielding means incorporate a longitudinally sliding packing gland and said expansion force yielding means incorporated a longitudinally sliding packing gland.

References Cited by the Examiner
UNITED STATES PATENTS

| | | | |
|---|---|---|---|
| 2,857,175 | 10/1958 | Browning et al. | 285—114 X |
| 2,867,242 | 1/1959 | Harris et al. | 285—226 X |
| 3,096,104 | 7/1963 | Browning | 138—28 X |

LAVERNE D. GEIGER, *Primary Examiner.*

SAMUEL ROTHBERG, *Examiner.*

T. L. MOOREHEAD, *Assistant Examiner.*